United States Patent [19]
Speidel

[11] 3,905,499
[45] Sept. 16, 1975

[54] BOAT LIFTING DEVICE

[76] Inventor: Leslie Raymond Speidel, 2797 E. 48th Ave., Vancouver, British Columbia, Canada

[22] Filed: Apr. 9, 1974

[21] Appl. No.: 459,350

[52] U.S. Cl. .................................. 214/450; 214/450
[51] Int. Cl.² ............................................ B60R 9/00
[58] Field of Search. 214/450; 224/42.03 R, 42.1 R, 224/42.1 H, 42.1 F

[56] References Cited
UNITED STATES PATENTS

| | | | |
|---|---|---|---|
| 3,762,587 | 10/1973 | Longee | 214/450 |
| 3,836,029 | 9/1974 | Ruedebusch | 214/450 |

*Primary Examiner*—David Schonberg
*Assistant Examiner*—Michael J. Forman
*Attorney, Agent, or Firm*—Carver and Company

[57] ABSTRACT

Device for raising with minimal operator effort a boat onto and for lowering boat from a vehicle having a relatively high roof. Device includes hinged framework having a pair of spaced, similar generally L-shaped side members, inner ends of which are hinged to vehicle rear bumper, and first and second pulleys are provided adjacent outer ends thereof. Tie rod extends between members at frame corner and cooperates with hinge means secured to boat stern. Winch on vehicle carries cable which extends from pulley pair at rear of vehicle roof, around second and first pulleys respectively to boat bow. When cable is wound in, boat hinges through 90° about tie rod until gunwales are adjacent framework, where second pulley is adjacent boat centre of gravity. Further winding of cable rotates boat and framework through ninety degrees about hinged inner ends of framework until boat and framework lie on vehicle roof. Winch is reversed as boat centre of gravity passes forward over pulley pair, permitting boat to be lowered gradually onto vehicle roof. Boat lowered from roof by reversing procedure.

10 Claims, 16 Drawing Figures

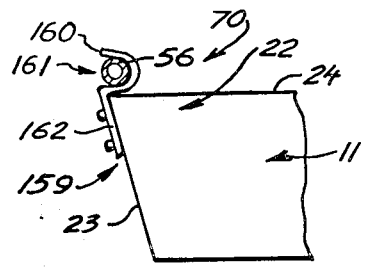
Fig. 13
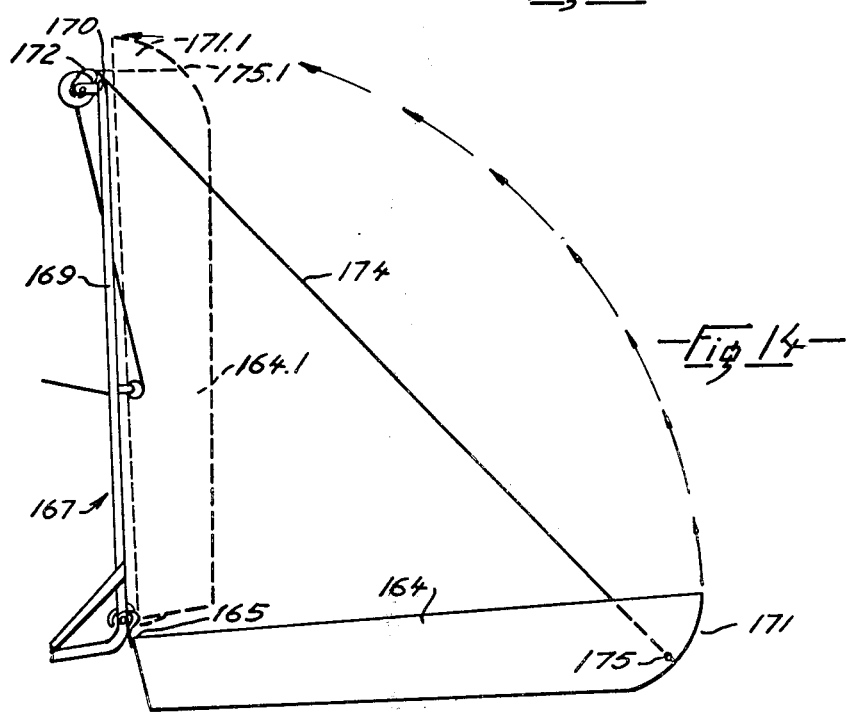
Fig. 14
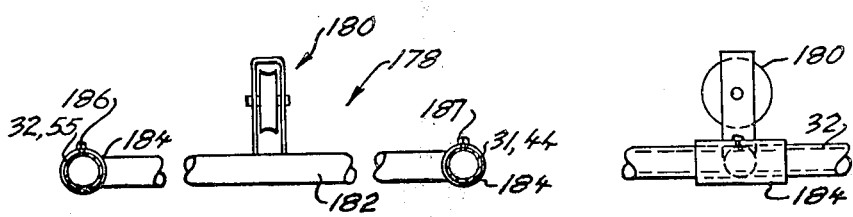
Fig. 15
Fig. 16

BOAT LIFTING DEVICE

BACKGROUND OF THE INVENTION

1. Field of the Invention

Invention relates to a device for lifting boats onto, and removing boats from, a motor vehicle; being particularly adapted for but not limited to handling boats carried on recreational camping vehicles commonly known as campers, motorized homes or house trailers.

2. Prior Art

Lightweight portable boats as commonly used by sports fishermen are adapted for carrying on roof-racks of vehicles, thus eliminating the need for a trailer. Such boats, commonly referred to as "car-top boats," have lengths of between 10 and 14 feet and are commonly made of sheet aluminum and weigh between 80 and 120 pounds. Little difficulty is experienced by most people in handling such a boat onto and from a roof-rack mounted on a common sedan or other low vehicle in which the roof-rack is less than about 5 feet above the ground. If the boat is to be carried on the roof of a camper truck or motorized home, difficulty is commonly experienced as the roof is quite often between 8 and 10 feet above the ground.

Many ingenious devices have been invented to overcome difficulties of raising the boat onto a vehicle roof or support having a height of between about 5 and 7 feet above the ground, some such devices being shown in U.S. Pat. Nos. 3,478,908 and 3,716,156. These devices function adequately for loading a boat having a length considerably greater than the height of the roof above the ground. Commonly, the boat is upended on the transom thereof and a rope extending from the bow thereof to the vehicle levers the boat over the upper rear portion of the roof and rocks the boat onto the roof. If the vehicle has a height longer than the length of the boat difficulty is usually experienced. In some devices, once the boat has been hauled beyond its balance point on a rear edge of the vehicle roof, it becomes unstable and falls onto the roof of the vehicle with a risk of damaging both the boat and the vehicle. Also some devices require precise positioning of the boat on land relative to the vehicle before the device can engage the boat.

Further, although many devices are available for hauling boats onto the vehicle roof, no devices known to the inventor provide mechanical means of removing the boat from the roof of the vehicle in a controlled fashion. In most devices, at least one person is required to climb onto the roof of the vehicle at least to move the boat by hand to an edge of the roof so that the boat tips downwards about the edge. From such a position mechanical handling of the boat can usually move the boat to a horizontal position.

SUMMARY OF THE INVENTION

The invention reduces difficulties of the prior art by providing a boat-lifting device which, with minimal physical effort on the part of the operator, can haul a boat onto and remove it from the roof of a relatively tall vehicle. The device is adaptable to accommodate boats of different lengths so that a boat that is shorter than the height of the vehicle can be raised onto the roof. Further, in certain circumstances the device can be used to lower a boat onto, or to haul a boat off, the surface of the water, thus eliminating hauling the boat on land.

A device according to the invention is for use with the vehicle having a generally horizontal support means spaced at a support height above the ground, the support means having spaced upper and lower rear portions. The boat to be handled has a bow, a stern and gunwales, and a centre of gravity disposed adjacent to a central vertical plane extending between the bow and stern. The central vertical plane is adapted to coincide generally with a central vertical plane of the vehicle when the boat is carried on the vehicle. The device includes a hinged framework having a pair of spaced, similar, generally L-shaped side members. Each side member has first and second portions, the first portion having inner and outer ends, the outer end being adapted to be hinged to the lower rear portion of the support means so as to permit swinging thereof about a horizontal hinge axis disposed transversely of the vehicle. The first portion has a length greater than spacing between the upper and lower rear portions of the support means. The second portion of the L-shaped side member has inner and outer ends, the inner ends of the first and second portion being secured together at a frame corner so that the portions are inclined to each other at a frame angle. The second portion has a length greater than the spacing between the stern and the centre of gravity of the boat. The hinged framework further includes a transverse tie rod extending between the L-shaped side members so as to secure the side members together so that the first and the second portions of each L-shaped side member are disposed in first and second planes respectively and inclined at the frame angle. This forms an essentially rigid framework that can hinge about the hinge axis as a single unit. The hinged framework further includes first and second pulleys mounted on the framework for rotation within generally vertical planes. The pulleys are positioned on the framework so that when the boat gunwales are adjacent the second members of the framework with the stern thereof adjacent the frame corner of the framework, the first pulley is positioned forward of the centre of gravity of the boat and the second pulley is positioned generally adjacent to the centre of gravity of the boat. The device further includes an aligned spaced pulley pair journalled for rotation within a vertical plane at a position adjacent the upper rear portion of the vehicle support. A reversible winch means is secured to the vehicle and a flexible tension link such as a cable has an inner end cooperating with the winch means and an outer end adapted to be secured to the boat at a position forward of the centre of gravity thereof. The link passes from the boat, over the first pulley, around the second pulley and between the pulley pair and thence to the winch. A hinge means is adapted to be secured to the stern of the boat and cooperates with the tie rod at the corner of the framework to permit swinging to the boat thereabouts. Boat engaging means on the second portion of the frame member engages the boat when the gunwales are adjacent to the second portion to reduce lateral movement between the boat and the framework.

In operation, when the frame is in a lowered position, the boat is positioned upright with the central plane thereof generally normal to the hinge axis. The bow is positioned remote from the vehicle and the stern is adjacent to the frame corner with the hinge means cooperating with the tie rod of the framework. When the winch takes in the link the bow of the boat is raised upwards so that the boat rotates around the tie rod until the gunwales are adjacent to the second portions of the framework, the boat being held thereagainst link tension and the engaging means. Further operation of the winch rotates the framework through approximately 90° about the hinge axis to a fully raised position. Thus the boat is lifted above and forward of the upper rear portion of the supporting means, the boat simultaneously rotating about the stern thereof to assume an inverted position supported on the vehicle. Control of the boat is maintained throughout by reversal of the winch means as the centre of gravity of the boat passes forward of the pulley pair.

A detailed disclosure following related to drawings, describes a preferred embodiment of the invention, which however is capable of expression in structure other than that particularly described and illustrated.

DESCRIPTION OF THE DRAWINGS

FIG. 13 is a fragmented side elevation of a stern of a boat showing hinge means, FIG. 14 is a fragmented side elevation of a portion of an alternative device, FIG. 15 is a fragmented elevation of an alternative pulley support, FIG. 16 is a side elevation of the support of FIG. 15.

DETAILED DISCLOSURE

Figure 1:
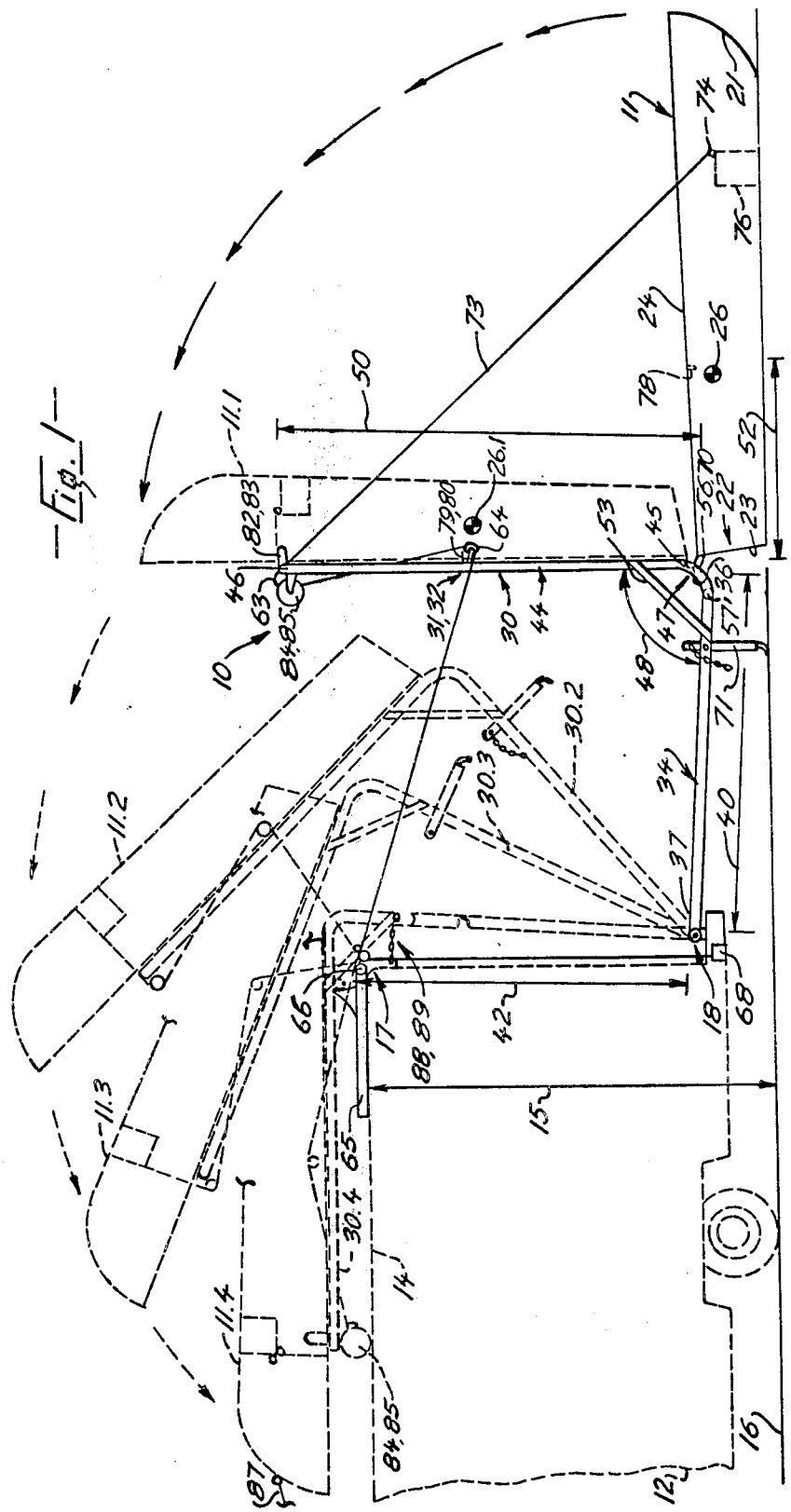
FIG. 1 is a fragmented side elevation of a boat lifting device according to the invention, shown in full outline prior to being lifted onto the vehicle, and in broken outline in a series of positions as the boat is raised onto the vehicle.
Figure 2:
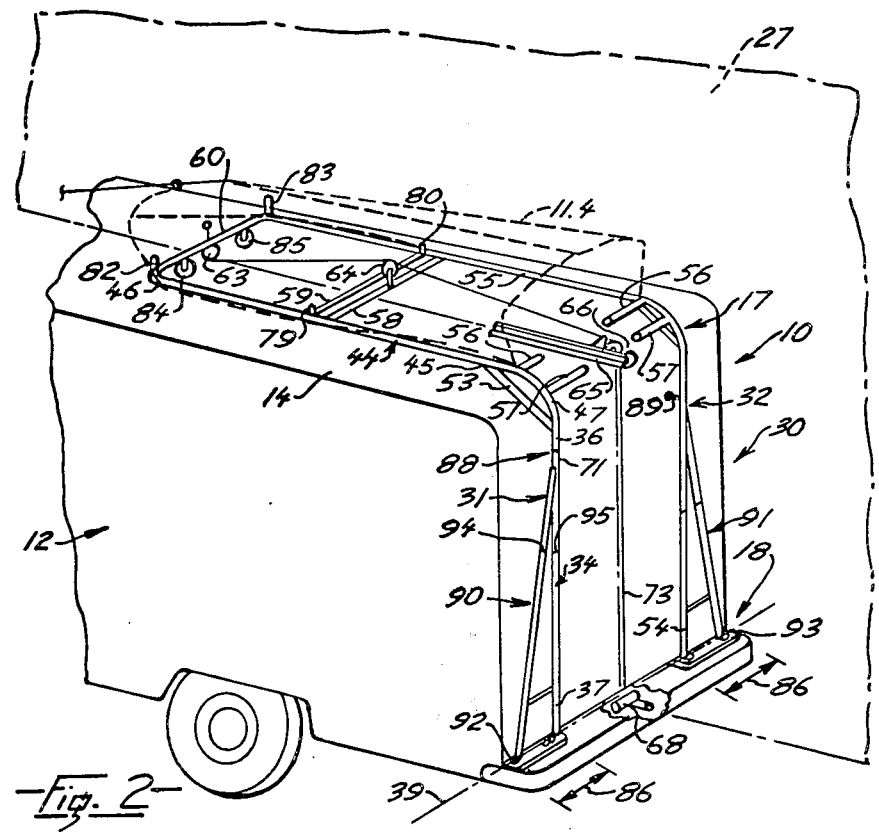
FIG. 2 is a fragmented perspective of a rear portion of the vehicle, showing the boat in a fully raised position supported by the vehicle.

FIGS. 1 and 2

A device 10 according to the invention is for raising a boat 11 onto a vehicle 12 and for lowering the boat therefrom. The vehicle has a generally horizontal support means 14 spaced at a support height 15 above ground 16, the support means having spaced upper and lower rear portions 17 and 18. The support means is shown as a roof and rear end wall of a motorized home, however other recreational vehicles can be adapted and any means of supporting a boat horizontally on a vehicle is equivalent, such as a suitable roof rack.

The boat 11 has a bow 21, a stern 22 having a transom 23, and gunwales 24. Center of gravity 26 of the boat is disposed adjacent a central vertical plane 27 extending between the bow and the stern, the central vertical plane being adapted to coincide generally with a central vertical plane of the vehicle when the boat is carried on the vehicle, the vertical plane being shown diagrammatically in broken outline in FIG. 2.

The device includes a hinged framework 30 having a pair of spaced, similar, generally L-shaped side members 31 and 32. The side member 31 has a first portion 34 having inner and outer ends 36 and 37, the outer end 37 being hinged to the lower rear portion 18 so as to permit swinging about a horizontal hinge axis 39 disposed transversely on the vehicle. Most camping vehicles have a substantial rear bumper and this has been found satisfactory for securing hinges to serve as the lower rear portion 18. The first portion has a length 40 greater than spacing 42 between the upper and lower portions of the support means for reasons as will be described. The side member 31 has a second portion 44 having inner and outer ends 45 and 46, the inner ends 36 and 45 of the first and second portions being secured together at a frame corner 47 so that the portions are inclined to each other at a frame angle 48. The second portion has a length 50 greater than a spacing 52 between the stern and the centre of gravity 26 of the boat. A corner stiffener 53 extends between the first and second portions so as to reduce a tendency of the portions to move relative to each other. The L-shaped side member 32 has similar first and second portions 54 and 55, seen in FIG. 2.

The hinged framework further includes a transverse tie rod 56 extending between the L-shaped side members adjacent the frame corner 47, the tie rod being shown broken in FIG. 2 for clarity. The tie rod secures the side members 31 and 32 together so that the first and second portions of each side member are disposed in first and second undesignated planes respectively, the planes being inclined at the frame angle so as to form an essentially rigid framework that can hinge about the hinge axis as a single unit. As seen in FIG. 2, spaced second, third, fourth and fifth upper tie rods 57 through 60 respectively also extend between the side members providing further stiffening of the framework and support for other structure as will be described.

First and second pulleys 63 and 64 are journalled for rotation within generally vertical planes and mounted on the tie rods 58 and 60 secured to the framework at particular locations dependent on the boat, as will be described.

A pulley pair 66 mounted on a bracket 65 is positioned adjacent the upper rear portion 17 of the vehicle support means and is described in greater detail with reference to FIGS. 11 and 12. A reversible winch means 68 is secured to the vehicle at a low position adjacent the lower portion 18 of the support for easy access. If the winch means is manual it is low geared, preferably by a worm drive, so as to prevent essentially backdriving of the winch when loaded but not held. If the winch is electric it can be operated by a remote control unit (not shown), so that an operator, outside the vehicle can control winch direction concurrently whilst watching the boat. The boat has a hinge means 70 secured to the transom 23, the hinge means being adapted to cooperate with the tie rod 56 at the corner of the framework to permit swinging of the boat thereabout, and is described in greater detail with reference to FIG. 13.

A leg 71 is hinged adjacent the inner end 36 of the first portion 34, so that, when the leg is extended as shown it supports the side member 30 with the tie rod 56 positioned at a height above the ground convenient for engaging the hinge means 70 with the tie rod. The side member 32 has a similar leg, not shown, the legs being hinged for swinging relative to the side member between extended and retracted positions to be described with reference to FIGS. 5 through 7. A flexible tension link such as a flexible wire rope or cable 73 has inner and outer ends, the outer end adapted to be secured to the boat at a position 74 forward of the centre of gravity 26. The inner end cooperates with the winch means 68 for winding of the cable around the winch. The cable passes from the boat over the first pulley 63, around the second pulley 64 and between the pulley pair 66 to the winch means. As shown the position 74 is adjacent a seat 76 near the bow 21, the seat being reinforced if necessary to carry loads from the cable. An alternative position for attaching the cable is shown in FIG. 14, which is used when the link is not secured to the seat.

In FIG. 1 the boat 11 and framework 30 are shown in full outlines in lowered positions, prior to raising the boat. In this position the boat is upright with the central plane thereof generally normal to the hinge axis with the bow 21 remote from the vehicle and the stern 22 adjacent to the frame corner 47. The hinge means 70 of the boat cooperates with the tie rod 56 so that when the winch takes in the cable the bow of the boat is raised upwards as the boat rotates about the tie rod. As the winch takes in the cable the boat gunwales 24 are drawn against the second portions 44 and 45 after the boat has rotated through about 90°, as shown in broken outline in an initial raised position 11.1. When the boat is so positioned the second pulley 64 is positioned generally adjacent, i.e. approximately level with, the centre of gravity 26 of the boat, now shown in an initial raised position 26.1. As can be seen, in the position 11.1 the first pulley 63 is positioned forward of the centre of gravity, i.e. above the centre of gravity. The first pulley is also so positioned so that when the boat is in the initial raised position 11.1 cable 73 extends between the first pulley and the boat approximately normal to the second portions of the side members. This reduces cable tension from the tension that would arise in an obliquely inclined cable and thus, for moderate cable tension ensures snug fitting of the boat gunwales against the second members.

Each gunwale has at least one opening to receive a rowlock (not shown) one such opening 78 being shown in one gunwale in FIG. 1. As can be seen, the opening 78 is positioned generally adjacent the centre of gravity 26, i.e. slightly above when the boat is upright, but this relates to boat design and is not essential to the invention. Dowels 79 and 80 extend normally from second portions 44 and 55 so that when the boat is in the initial raised position 11.1, the dowels engage the openings in the gunwales, the dowels and openings to be described in greater detail with reference to FIGS. 9 and 10.

Two spaced projections 82 and 83 extend from outer ends of the second portions 44 and 55 respectively and, as seen in FIG. 2, are spaced sufficiently to permit gunwales of the boat to fit snugly therebetween, so as to reduce lateral movement of the boat when the boat is held against the second portions of the framework. The projections are adjustable longitudinally of the second portions 44 and 55 to accommodate boats of different dimensions. The dowels 79 and 80 and the projections 82 and 83 serve as boat engaging means on the second portions to reduce movement between the boat and the framework. Thus the boat is held against the second portions by link tension, engagement of the dowels 79 and 80 in the openings of the rowlocks, the hinge means 70 on the transom engaged with the tie rod 56, and the gunwales of the boat being retained between the spaced projections 82 and 83. As there is redundancy in this restraint there is little likelihood of loosing of the boat, either during raising onto the vehicle roof, or motoring with the boat on the roof.

Outer ends of the second portions 44 and 55 are provided with spaced rollers 84 and 85 mounted for rotation within vertical planes so that the rollers can roll along the vehicle roof or support means as the framework approaches or recedes from a fully raised position as will be described. The rollers, mounted on the tie rod 60 extending between the portions 44 and 55, are spaced at positions so as to roll along roof supports of the vehicle so that weight of the boat and the framework is transmitted to load bearing frame members within the vehicle roof. If the rollers were not so spaced they might roll along relatively flexible sheet metal panels which would be prone to buckling and damage.

Continued taking-in of the cable from the initial raised position 11.1 of the boat rotates the framework through approximately 90° during which the boat and framework pass through intermediate positions 11.2, 11.3 and 30.2, 30.3 respectively to assume fully raised positions 11.4, 30.4. When fully raised the rollers 84 and 85 are supported on the roof of the vehicle and the bow is further restrained against movement by a painter 87 on the bow which extends to a suitable anchoring means (not shown) adjacent the front of the vehicle. The leg 71 serves also to retain the framework against the vehicle through a releasable latch means 88 positioned adjacent the upper portion of the support means, and is described with reference to FIGS. 5 through 7. The leg for the member 31 similarly cooperates with a releasable latch means 89. Thus the framework is secured to the vehicle roof directly by the latch means 88 and 89 and indirectly by cable tension through the boat and the painter 8.

Side braces 90 and 91 are provided adjacent outer ends of the first portions 34 and 54 respectively of the side members, the side braces being secured adjacent the frame corners and extending to hinges on the hinge axis 39 at spaced outer ends 92 and 93 respectively. The outer end of each brace is spaced sufficiently from the adjacent outer end of the respective first portion and coaxially hinged so as to provide at each outer end of the frame member a hinge having a hinge length 86 sufficient to resist lateral swaying forces that might occur while the boat is moving between the lowered and raised positions, particularly in strong side winds, or if the vehicle is leaning to one side, which would impose asymmetrical and twisting forces on the framework arising from the weight of the boat.

Joins 94 and 95 in the side brace 90 and first portion 34 are junctions between complementary sections of the side brace and first portion, which have telescoping sections to provide length adjustment of the first portion and the side brace to accommodate vehicles having different support heights. If the device is to be used with vehicles having similar support or roof heights, the telescoping sections can be eliminated so that the first portion is in one piece. If necessary, to accommodate boats of widely different lengths the second portions of the framework can be similarly telescoping. This is not necessary for most boats — as normal length variations are accommodated by movement of the second pulley as will be described.

Figure 3:
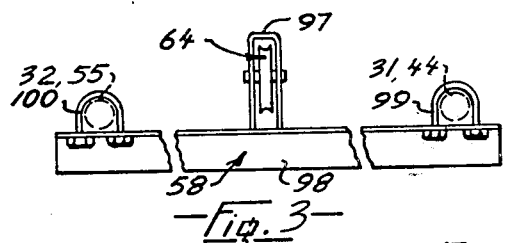
FIG. 3 is a fragmented elevation of support means for a first pulley of the device.
Figure 4:
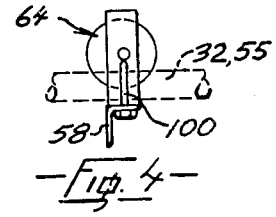
FIG. 4 is a side elevation of the support means and pulley of FIG. 3.

FIGS. 3 and 4

The second pulley 64 is journalled for rotation in a pulley support 97 secured to the tie rod 58, which is a length of angle iron 98 extending between the second portions 44 and 55. U-bolts 99 and 100 secure the tie rod to the frame members and provide adjustability of the second pulley position to accommodate boats of different weights and sizes. For reasons to be explained, the second pulley is positioned near the centre of gravity 26 of the boat and thus such adjustability is important to permit selective longitudinal movement of the second pulley to permit positioning of the second pulley adjacent the centre of gravity. An alternative means of obtaining adjustability is shown in FIGS. 15 and 16. The tie rod 60, extending between outer ends of the second portions 44 and 55 can be similarly secured, or if required can be a more permanent structure such as a tube connected to elbows (not shown) extending from the outer ends of the frame members which are also tubes. Adjustability of the position of the first pulley 63 is not so critical, provided the first pulley 63 is positioned between the centre of gravity and the bow of the boat when the boat is in the initial raised position.

Figure 5:
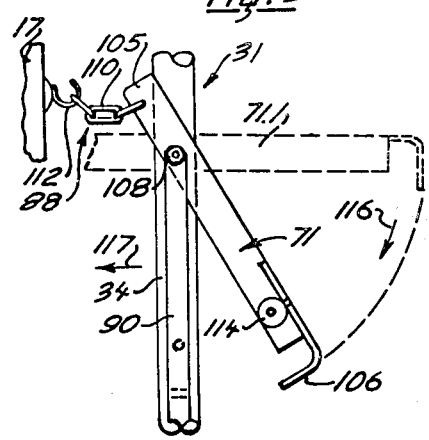
FIG. 5 is a fragmented side elevation of latch means at a rear of the vehicle showing a leg used also for supporting the device relative to the boat, the leg being shown before retraction.
Figure 6:
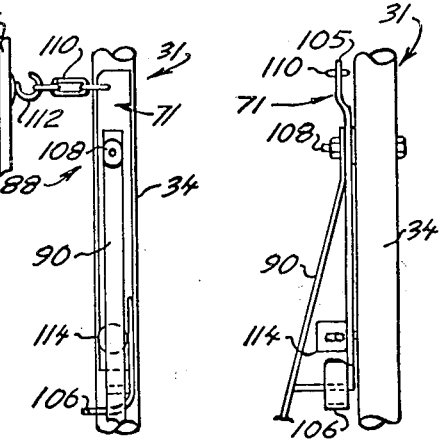
FIG. 6 is a fragmented side elevation of the latch means of FIG. 5, the leg shown retracted.
Figure 7:
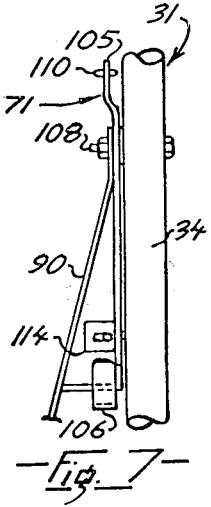
FIG. 7 is a fragmented end elevation of FIG. 6.

FIGS. 5 through 7

Figure 8:
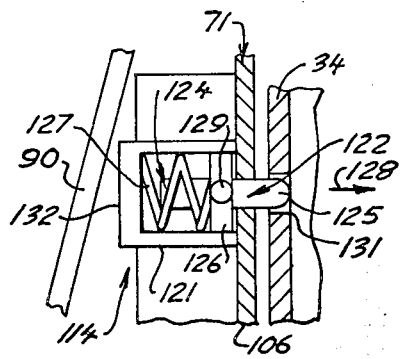
FIG. 8 is a fragmented, partially-sectioned elevation of a leg locking means.

In FIG. 5 the leg 71 is shown in full outline in an intermediate position and in broken outline in an extended position 71.1 for supporting the hinged framework as in FIG. 1. The leg 71 has upper and lower ends 105 and 106 and is hinged between the ends on a bolt 108 passing through the first portion 34, the leg and the side brace 90, the leg being sandwiched between the portion 34 and the side brace as best seen in FIG. 7. The lower end 106 is adapted to contact the ground when the leg is extended and the framework 30 is in the lowered position. The latch means 88 includes a short length of chain 110 secured to the upper end 105 and a hook 112 secured to the vehicle and spaced downwards from the upper rear portion of the support means, and positioned adjacent to the rear of the vehicle above the hinge axis. A leg-locking means 114 is mounted on the leg adjacent the outer end thereof and is described in greater detail with reference to FIG. 8. The leg-locking means cooperates with the leg and the first portion 34 to hold the leg in a retracted position relative to the frame as shown in FIGS. 6 and 7.

In operation, when the hinged framework 30 is in the fully raised position 30.4 so that the first portion 34 is adjacent the rear of the vehicle, the leg 71 is swung to the intermediate position (FIG. 5) so that the chain 110 can engage the hook 112. Sufficient slack in the chain extends between the hook and the leg so that when the leg 71 is rotated in direction of an arrow 116 about the bolt 108, the chain 110 tightens and draws the portion 34 in direction of the arrow 117 towards the vehicle until the leg 71 is generally parallel to the portion 34 as shown in the retracted position in FIG. 6. As seen in FIG. 7 the end 105 is cranked away from the portion 34 to provide clearance from the chain 110 between the end 105 and the portion 34. In the retracted position the chain is taut and the leg-locking means 114 engages the portion 34. Clearly a flexible tension link other than a chain can be substituted for the chain 110. The corresponding leg for the side member 32 cooperates similarly with a respective hook so that both side members are drawn against the rear of the vehicle, providing positive locking of the hinged framework 30 to the vehicle. The latch means 88 and 89 and the painter 87 provide releasable means to retain the hinged framework in the raised position on the vehicle.

FIG. 8

The leg-locking means 114 has a hollow cylinder 121 having an axially disposed pin 122, the cylinder having an inner end secured to the leg 71. The pin has inner and outer ends 124 and 125 and a guide disc 126 secured thereto and slideable within the cylinder. A spring 127 extends between an end of the cylinder and the disc 126 to urge the pin outwards from the cylinder in direction of an arrow 128. A projection 129 extends radially outwards from the disc and outwards of the cylinder through a longitudinal slot in the cylinder (not shown), so that the pin can be slid manually by the projection to compress the spring to retract the outer end 124.

When the leg-locking means cooperates within the first portion 34, as the leg swings from the extended position to the retracted position the pin 122 is retracted due to sliding over the portion 34 until it passes an opening 131 in the portion 34. The spring forces the pin 122 to extend the outer end 125 into the opening, thus locking the leg 71 relative to the portion 34. In the retracted position, an outer end 132 of the cylinder is close to the side brace 90, so that accidental withdrawal of the end 124 from the opening 131 resulting from the deflection of the framework is essentially eliminated by interference of the cylinder with the side brace.

Figure 9:
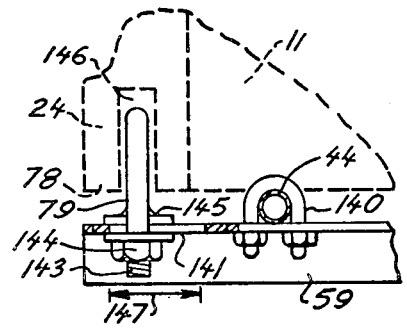
FIG. 9 is a fragmented elevation of boat engaging means, showing a portion of the boat.
Figure 10:
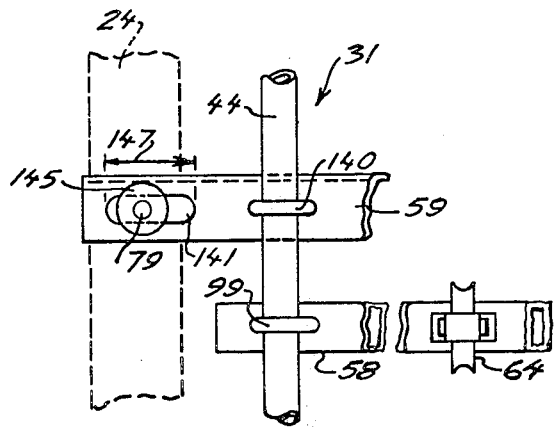
FIG. 10 is a top plan of the boat engaging means of FIG. 9, support for the first pulley also being shown.

FIGS. 9 and 10

The dowel 79 is secured to the tie-rod 59 and is adjustable longitudinally and transversely of the framework. The tie rod 59 is secured to the second portion 44 by a U-bolt 140 which provides longitudinal adjustment of the positioning of the end of the tie-rod 59. An outer end of the rod 59, which is angle sectioned as shown, has an elongated slot 141 to accept a threaded end 143 of the dowel 79. A washer 145 is welded to the dowel to form a shoulder, and a nut and washer means 144 secures the dowel at a selected position in the slot. A rowlock opening 146 in the gunwale 24, in broken outline in FIG. 9, accepts the dowel 78, the boat resting on second portions of the framework when in the fully raised position. Thus the dowel has a lateral adjustment 147 along the slot, i.e. laterally of the framework, which is sufficient to accommodate a normal range of spacing between rowlock openings in common car-top boats. An opposite end of the tie-rod (not shown) is similarly provided with the dowel 80 (FIG. 2) and through a similar U-bolt connection to the framework an adequate range of adjustment is provided. As can be seen in FIG. 10 the tie rod 58 carrying the pulley 64 is square sectioned and thus can be positioned closely to the tie-rod 59 to accommodate a boat in which the centre of gravity thereof is close to the rowlocks.

Figure 11:
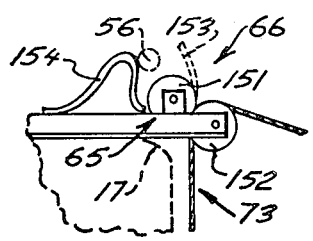
FIG. 11 is a fragmented elevation of a spaced pulley pair.
Figure 12:
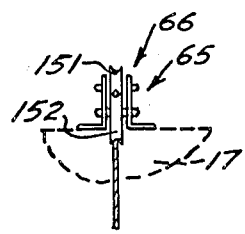
FIG. 12 is a fragmented end elevation of the pulley pair of FIG. 11.

FIGS. 11 and 12

The pulley pair 66 has a pair of spaced pulleys 151 and 152 disposed in a vertical plane, and spaced sufficiently to permit the cable 73 to pass therebetween. The pulley 151 is spaced upwards and forwards relative to the pulley 152 to accommodate swinging of a run of cable extending from the second pulley 64 to the pulley pair as the framework 30 passes over the pulley pair. The run moves from a position shown in full line to a position 153 in broken line as the pulley 64 moves from aft to forward of the pulley pair. A stop 154 is provided forward of the pulley 151, the stop being positioned so as to interfere with the tie-rod 56 (broken line) substantially simultaneously with final positioning of the hinged framework on top of the vehicle, that is when the rollers 84 and 85 (FIG. 2) reach an extreme forward position supported on the vehicle.

FIG. 13

The hinge means 70 has a pair of similar, laterally spaced brackets secured to the transom 23, one bracker 159 only shown. An upper end 160 of the bracket 159 defines an aft-facing, U-shaped opening 161 to accept the tie rod 56. The bracket extends tangentially aft to provide sufficient enclosure of the rod to reduce the risk of the rod disengaging from the opening as the boat rotates about the rod. The bracket has a lower end 162 secured to the transom so that the opening 161 is disposed at a height acceptable to the tie rod 56 when the framework is supported on the legs.

OPERATION

With reference to FIG. 1, the boat 11 is positioned so that the stern 22 is adjacent the frame corner 47 and the bow is remote from the vehicle. The framework 30 is in the lowered position supported on the legs and the hinge means 70 cooperates with the tie rod 56. The boat can be floating on water, in which case the vehicle is driven down a slipway until the legs can be positioned convenient for the tie rod 56 to engage the hinge means. The outer end of the cable 73 is attached to the seat, or other suitable anchoring point, and the winch started so that the cable is wound in, drawing the boat to the initial raised position 11.1. When so raised, the openings for the rowlocks are engaged by the dowels 79 and 80, and the gunwales are positioned between the projections 82 and 83. As the winch winds in more cable, the framework rotates about the hinge axis 39, passing through the intermediate position 30.2 in which the centre of gravity 26 is aft of the pulley pair 66. As the framework swings further forward to the position 30.3, the centre of gravity of the boat passes over the pulley pair 66. Note that when the centre of gravity of the boat is aft of the pulley pair, the boat is restricted against movement aft by cable tension. When the centre of gravity is forward of the pulley pair, the forces reverse and the boat is now restricted against movement forwards by cable tension. Thus, as the centre of gravity passes over the pulley pair the operator stops the winch, which does not pay out cable when under a load, and the boat passes through a balance position. The framework is now held by the cable against forward movement. The winch is now reversed and pays out the cable so that the weight of the boat carries the framework and the boat forward onto the support means, through the intermediate positions 30.3 and 11.3 to the fully raised positions 30.4 and 11.4. As the framework settles on the roof, the rollers 84 and 85 roll a few inches forward along the roof. Substantially simultaneously with the rollers 84 and 85 reaching a forwardmost position on the vehicle the tie rod 56 engages the stop 154. The painter 87 is tied to a suitable anchor at the front of the vehicle, and the latch means 88 and 89 are actuated so that the leg locking means are engaged and cooperate with the framework so as to prevent rearward movement of the framework. The boat is now secured on the vehicle which can be driven.

For lowering the boat, the painter 87 and the latch means are released so that the legs can be extended and the winch is operated so as to take in cable which swings the boat from the position 11.4 to the position 11.3. Further taking in of cable causes the centre of gravity 26 to move aft over the pulley pair 66 at which instant the winch is reversed, and the cable is now paid out to lower the boat until the leg 71 contacts the ground. The boat is now in the position 11.1, and further paying out of cable permits the boat to swing through approximately 90° to the upright position.

In the above discussion weight of the framework is ignored. In practice the longitudinal position of the second pulley is adjusted so that movement of the centre of gravity over the pulley pair is accomplished smoothly and under essentially continuous control of the operator.

ALTERNATIVES AND EQUIVALENTS

FIG. 14

An alternative boat 164 is shown with a hinge means 165 thereof engaged with an alternative hinged framework 167, essentially similar to the hinged framework 30 of FIG. 1. The framework 167 differs by having extended second portions, one only being shown and designated 169 which extends to an outer end 170. The outer end 170 is positioned so that when the boat is in an initial raised position 164.1, a bow 171 of the boat is in a raised position 171.1 adjacent the end 170. The alternative boat does not have a seat capable of withstanding the force of a cable when being raised, thus an eye-bolt 175 is secured to the bow which is usually sufficiently strong to resist cable forces. Thus length of the second portion is increased to accommodate the repositioning of the anchor in the boat. An alternative first pulley 172 is positioned adjacent the outer end 170 so that, when the boat is in the raised position a run of cable 174 extends normally from a raised position 175.1 of the eye-bolt to the pulley. The alternative arrangement is preferred for use with a relatively heavy and long boat.

FIGS. 16 and 17

An alternative tie rod 178 carries a pulley 180 and can be substituted for the tie rod 58 and pulley 64 of FIG. 2. The alternative tie rod has alternative means of providing longitudinal adjustment of the pulley along the framework. The tie rod is a length of cylindrical tube 182 extending between the second portions 44 and 55 and having two short lengths of tube 184 and 185 secured at right angles to outer ends thereof. The short lengths of tube are sliding fits on the second portions 44 and 55 which are also cylindrical tubing. Screws 186 and 187 extend radially through the short lengths of tube and, when tightened, interfere with the side members to prevent movement. The screws and tubes as above provide releasable means for adjustment of the pulley relative to the side members.

I claim:
1. A device for raising a boat onto a vehicle and for lowering the boat from the vehicle, the vehicle having a generally horizontal support means spaced at a support height above the ground, the support means having spaced upper and lower rear portions; the boat having a bow, a stern, gunwales, and a centre of gravity disposed adjacent a central vertical plane extending between the bow and stern, the central plane being adapted to coincide generally with a central vertical plane of the vehicle when the boat is carried on the vehicle, the device including:
   a. a hinged framework having a pair of spaced, similar, generally L-shaped side members, each L-shaped side member having:
      i. a first portion having inner and outer ends, the outer end being adapted to be hinged to the lower rear portion of the support means so as to permit swinging about a horizontal hinge axis disposed transversely of the vehicle, the first portion having a length greater than spacing between the upper and lower rear portions of the support means,
      ii. a second portion having inner and outer ends, the inner ends of the first and second portions being secured together at a frame corner so that the portions are inclined to each other at a frame angle, the second portion having a length greater than spacing between the stern and the centre of gravity of the boat,
   the hinged framework further including:
      iii. a transverse tie rod extending between the L-shaped side members so as to secure the side members together so that the first and second portion of each L-shaped side member are disposed in first and second planes respectively inclined at the frame angle so as to form an essentially rigid framework that can hinge about the hinge axis as a single unit,
      iv. first and second pulleys mounted on the framework and journalled for rotation within generally vertical planes, the pulleys being positioned on the framework so that when the boat gunwales are adjacent the second members of the framework with the stern thereof adjacent the frame corner of the framework, the first pulley is positioned forward of the centre of gravity of the boat and the second pulley is positioned generally adjacent the centre of gravity of the boat,
   the device further including:
   b. an aligned spaced pulley pair journalled for rotation within a vertical plane at a position adjacent the upper rear portion of the vehicle support means,
   c. reversible winch means secured to the vehicle,
   d. a flexible tension link having inner and outer ends, the outer end adapted to be secured to the boat at a position forward of the centre of gravity thereof, the inner end cooperating with the winch, the link passing from the boat over the first pulley, around the second pulley and between the pulley pair to the winch means,
   e. hinge means adapted to be secured to the stern of the boat and to cooperate releasably with the tie rod at the frame corner of the framework to permit swinging of the boat thereabouts,
   f. boat engaging means on the second portions of the frame member to engage the boat when the gunwales are adjacent the second portions to reduce movement between the boat and the framework,
   g. releasable means to retain the hinged framework in the raised position on the vehicle,
so that when the frame is in a lowered position and the boat is positioned upright with the central plane thereof generally normal to the hinge axis, the bow remote from the vehicle and the stern adjacent the frame corner with the hinge means of the boat cooperating with the tie rod of the framework, when the winch takes in the flexible link the bow of the boat is raised upwards as the boat rotates about the tie rod until the boat gunwales are brought adjacent the second portions of the framework, the boat being held thereagainst by link tension, and continued taking in of the link rotates the framework through approximately 90° about the hinge axis thereof to a fully raised position so that the boat is lifted above and forward of the upper rear portion of the supporting means, the boat simultaneously rotating about the stern thereof to assume an inverted position supported upon the vehicle, control of the boat being maintained throughout by reversal of the winch means as the boat centre of gravity passes forward of the pulley pair.

2. A device as claimed in claim 1 in which the first pulley is positioned between the bow and the centre of gravity of the boat when the gunwale is adjacent the second portions of the side members.

3. A device as claimed in claim 2 in which the outer end of the link is adapted to be secured to a portion of the boat between the bow and the centre of gravity thereof so that when the gunwales of the boat are drawn up against the second portions of the side members the link extends between the first pulley and the boat approximately normally to the second portions of the side members.

4. A device as claimed in claim 1 further including:
   g. a leg secured to each L-shaped side member to support the tie rod extending between side members at a height above the ground convenient for engaging the tie rod with the hinge means at the stern of the boat.

5. A device as claimed in claim 4 in which:
   i. each leg has upper and lower ends and is hinged to a respective first portion of the frame member at a position between the ends, the lower end adapted to contact the ground when the frame is in a lowered position,
and in which the releasable means to retain the hinged framework in the raised position includes a releasable latch means having:
   ii. a length of flexible tension link secured to the upper end of the leg,
   iii. a hook to accept the tension link provided at the rear of the vehicle above the hinge axis and below the upper rear portion of the support means,
   iv. leg locking means to cooperate with the leg and side member to hold the leg in a fixed position relative to the frame when the frame is raised, so that when the hinged framework is in the raised position each leg can be swung to an intermediate position such that the link can engage the hook with sufficient slack therebetween so that when the leg is rotated about the hinge the link tightens and draws the frame against the vehicle, and when the leg locking means are engaged the leg is retained against the side member and the hinged framework is retained snuggly against the vehicle.

6. A device as claimed in claim 1 in which rollers are provided adjacent outer ends of the second portions of the side members, the rollers being adapted to roll along the vehicle support as the framework approaches or recedes from the fully raised position.

7. A device as claimed in claim 1 in which:
 i. side braces are provided adjacent outer ends of the first portions of the frame, the side braces secured adjacent the frame corner and extending to hinges on the hinge axis at spaced outer ends thereof, the outer ends being spaced sufficiently from the adjacent outer end of the first portion of the side member to provide at each outer end of the hinged framework a hinge having a hinge length sufficient to resist lateral swaying forces.

8. A device as claimed in claim 1 in which the first portions of each L-shaped side member have telescoping sections to provide length adjustment of the first portion to accommodate vehicles having different support heights.

9. A device as claimed in claim 1 in which the boat engaging means includes;
 i. an upper tie rod extending between outer ends of the second portions,
 ii. a pair of spaced upwardly extending dowels mounted on the upper tie rod and adapted to engage openings adjacent the gunwales of the boat.

10. A device as claimed in claim 1 in which an upper tie rod extends normally between and is releasably secured to the second portions of the side members, the tie rod supporting the second pulley thereon so as to permit selective longitudinal movement of the second pulley to permit positioning of the second pulley adjacent the centre of gravity of the boat.

* * * * *